United States Patent [19]

Konuma et al.

[11] Patent Number: 5,295,018

[45] Date of Patent: Mar. 15, 1994

[54] POLARIZATION TRANSFORMING OPTICS, POLARIZING BEAM SPLITTER AND LIQUID CRYSTAL DISPLAY

[75] Inventors: Nobuhiro Konuma; Hiroshi Jitsukata, both of Yokohama; Tetsu Ohishi, Hiratsuka; Kyohei Fukuda, Fujisawa, all of Japan

[73] Assignee: Hitachi, Ltd., Tokyo, Japan

[21] Appl. No.: 845,647

[22] Filed: Mar. 4, 1992

[30] Foreign Application Priority Data

Mar. 4, 1991 [JP] Japan ................... 3-037141

[51] Int. Cl.$^5$ ................... G02B 5/30; G02B 27/28; G02F 1/1335
[52] U.S. Cl. ................... 359/487; 359/63; 359/495; 359/496
[58] Field of Search ............... 359/487, 495, 496, 497, 359/833, 834, 63

[56] References Cited

U.S. PATENT DOCUMENTS

| | | | |
|---|---|---|---|
| 2,432,432 | 12/1947 | MacNeille | 359/487 |
| 2,731,881 | 1/1956 | Kossel et al. | 359/487 |
| 2,748,659 | 6/1956 | Geffcken et al. | 359/495 |
| 3,389,632 | 6/1968 | Plummer | 359/487 |
| 3,743,380 | 7/1973 | Fugitt | 359/487 |
| 3,876,285 | 4/1975 | Schwarzmuller | 359/487 |
| 4,017,153 | 4/1977 | Sardos | 359/487 |
| 4,128,308 | 12/1978 | McNaney | 359/487 |
| 4,170,401 | 10/1979 | Yoder, Jr. et al. | 359/487 |
| 4,822,150 | 4/1989 | Duarte | 359/487 |
| 5,124,841 | 6/1992 | Oishi | 359/487 |

FOREIGN PATENT DOCUMENTS

63-197913  8/1988  Japan .
63-187101  11/1988  Japan .
2-64613    3/1990  Japan .

OTHER PUBLICATIONS

"Flat Panel Display," Institute of Electronic Information and Communications Engineers of Japan, Autumn Nationwide Meeting, 1991, Summary C-34, pp. 225-231.

*Primary Examiner*—Martin Lerner
*Attorney, Agent, or Firm*—Antonelli, Terry, Stout & Kraus

[57] ABSTRACT

In a polarization transforming optics having a polarizing beam splitter (PBS) for transforming x-direction incident light flux from a metal halide light source into a single linearly (z direction) polarized light flux beam heading in the y direction and delivering the beam to, preferably, a light valve of a liquid crystal display (LCD) in a coordinate space, the PBS splits the incident light flux from the light source into split light flux beams, separates the split light flux beams into linearly polarized light flux beams having polarizing directions which are orthogonal to each other, and delivers two linearly polarized outgoing light flux beams having polarizing directions which are orthogonal to each other and heading in directions parallel to a polarizing direction plane. One of the two outgoing light flux beams is deflected by a single mirror to have the same heading direction and polarizing direction as those of the other. The PBS is constructed by jointing together, for example, a quadrangular pyramidal prism and two triangular pyramidal prisms. A PBS film is formed at each joint interface and a surface in contact with air of each prism acts as a total reflection mirror surface. No wave plate is used to provide a compact apparatus having a high light utilization efficiency.

11 Claims, 11 Drawing Sheets

F I G. 1A
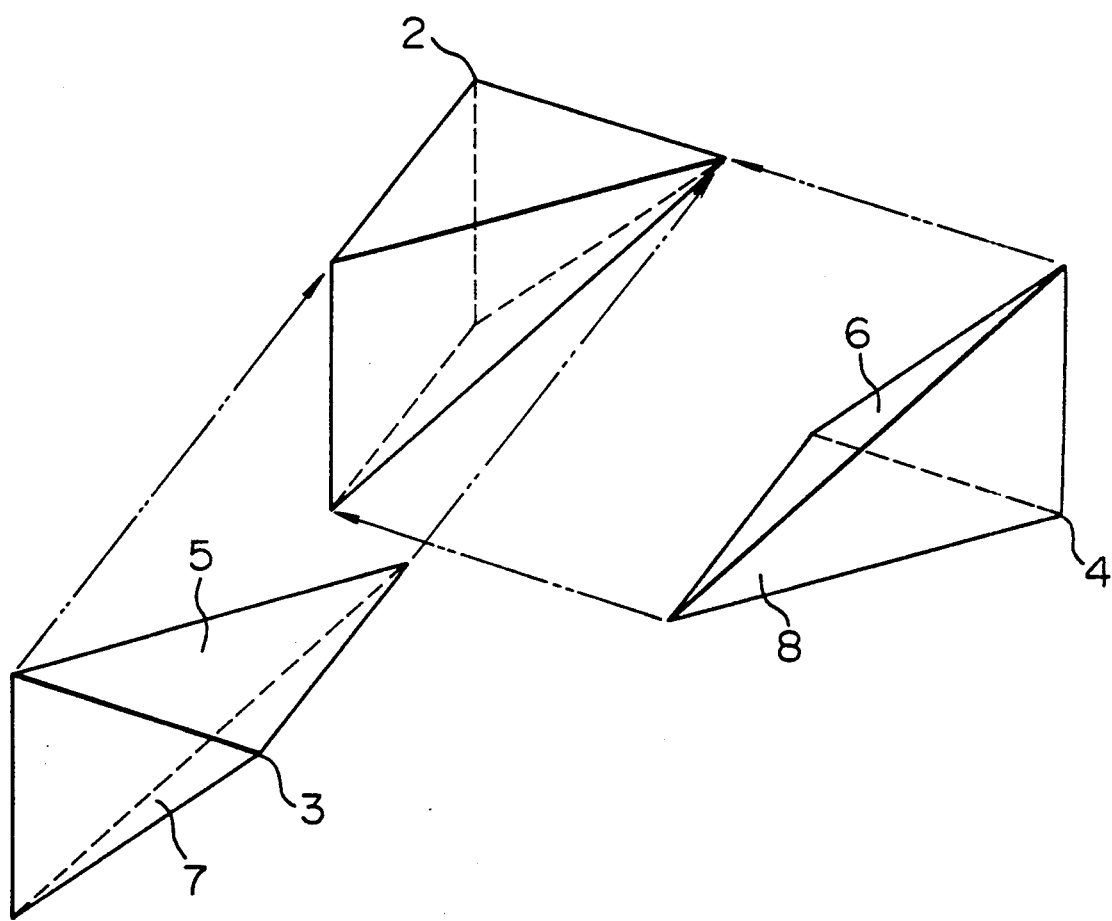

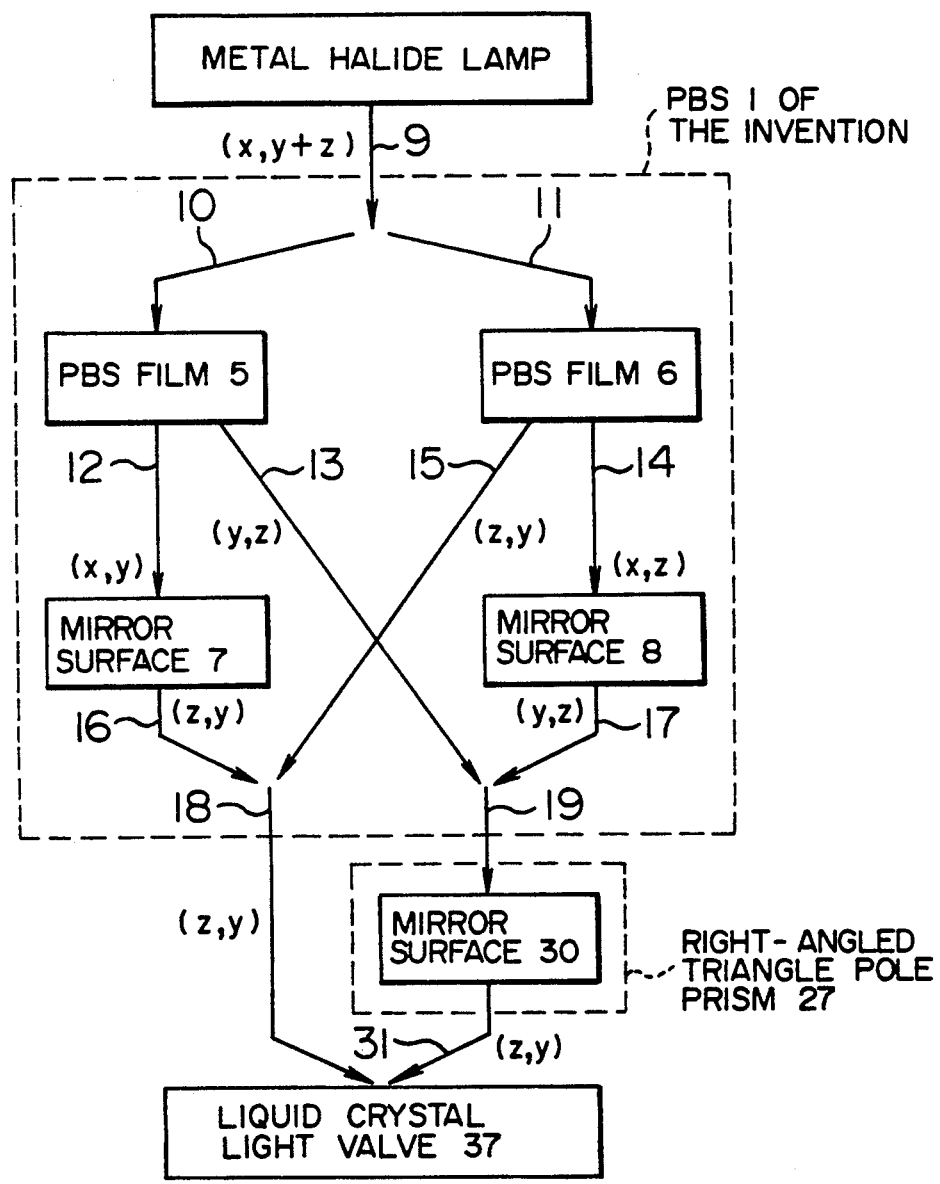

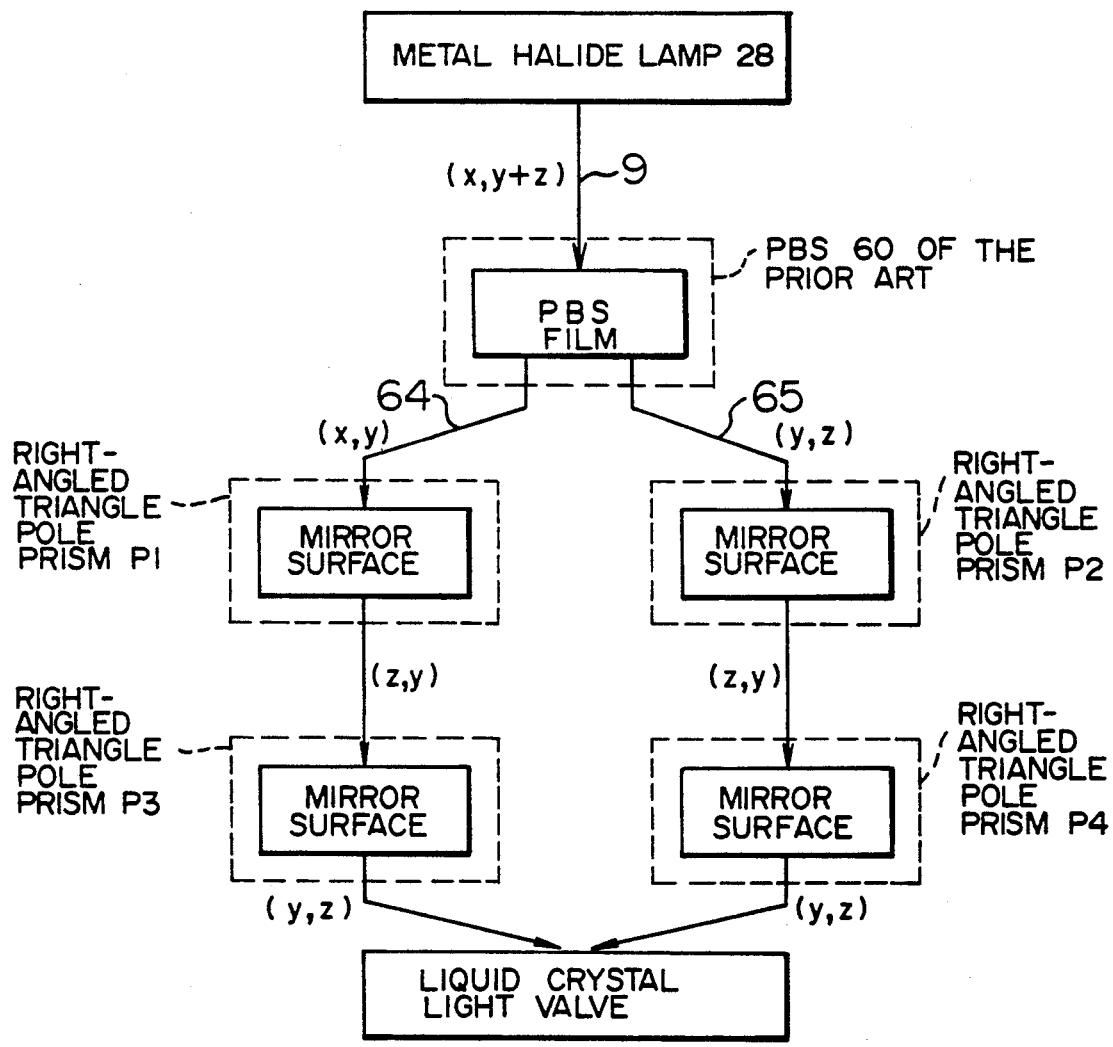

POLARIZATION TRANSFORMING OPTICS, POLARIZING BEAM SPLITTER AND LIQUID CRYSTAL DISPLAY

BACKGROUND OF THE INVENTION

The present invention relates to polarization transforming optics, polarizing beam splitters (PBS's) and liquid crystal displays (LCD's) and more particularly to a polarization transforming optics, a PBS and a LCD which are suitable for applications in which polarized light is used as illumination light for a liquid crystal light valve.

Available as an LCD utilizing polarized light is, for example, a liquid crystal projector using a TN (twisted nematic) type liquid crystal light valve.

Conventionally, this type of apparatus uses a polarization transforming optics of the type in which only flux of unidirectional, linearly polarized light is derived from flux of unpolarized light from a light source by means of a polarizer such as a polarizer plate made of polyvinyl alcohol or PBS to illuminate the liquid crystal light valve, and the attainable utilization efficiency of light is 50% even at its maximum.

Contrary to this, an LCD has been proposed including a polarization transforming optics in which light flux from a light source is separated by using a PBS into two linearly polarized light flux beams heading in directions which are orthogonal to each other and the polarizing plane of at least one of the two linearly polarized light flux beams is rotated so that the direction of linear polarization of the one linearly polarized light flux beam may coincide with that of the other linearly polarized light flux beam. Then, the two light flux beams delivered from the polarization transforming optics are used as illumination light for a liquid crystal light valve to obtain a light utilization efficiency which is 50% or more.

An example of the conventional PBS will be detailed below. FIG. 10 is a perspective view of a conventional PBS 60. In the PBS 60, triangle pole prisms 61 and 62 each having right-angled isosceles triangular base are jointed together to form a cubic shape as a whole. Each of the triangle pole prisms 61 and 62 is the same as a so-called right-angled prism or triangular prism. Formed at a joint interface between the triangle pole prisms 61 and 62 is a PBS film 63 which is an optical multi-layer thin film.

A polarizing separation operation will be described by referring to an instance where flux of light 9 heading in the x direction of Cartesian coordinates shown in the figure impinges upon the PBS 60, on the assumption that the incident light flux 9 is unpolarized light containing equally a polarized component 9y in the y direction and a polarized component 9z in the z direction, and that the incident light flux 9 has a cross-sectional form which is square like each side of the cube. The incident light flux 9 reaches the PBS film 63 by which it is split into two beams of linearly polarized outgoing light flux 64 and 65 having polarizing directions which are mutually orthogonal. More specifically, the P polarized outgoing light flux 64 transmitting through the PBS film 63 and heading in the x direction contains only a y-direction polarized component 64y corresponding to the polarized component 9y of the incident light flux 9 and the S polarized outgoing light flux 65 reflected by the PBS film 63 and heading in y direction contains only a z-direction polarized component 65z corresponding to the polarized component 9z of the incident light flux 9. Of the two beams of outgoing light flux 64 and 65 heading in a plane parallel to the xy plane, the outgoing light flux 64 has the polarized component 64y which is parallel to the xy plane but the outgoing light flux 65 has the polarized component 65z which is vertical to the xy plane.

Therefore, in order to realize a polarization transforming optics by using the conventional PBS 60, there is needed, in addition to a mirror for deflecting and transforming the heading direction of at least one of the two beams of outgoing light flux 64 and 65 into the heading direction of the other, an optical element for rotating the polarizing plane of at least one of the two beams of outgoing light flux 64 and 65 to transform the linear polarization direction of the one outgoing light flux into that of the other outgoing light flux.

In connection with the conventional polarization transforming optics using the PBS, Japanese Patent Application Laid-open Nos. Sho 61-90584, Sho 63-168622, Sho 63-271313, Hei 2-39084, Hei 2-69715, Hei 2-189504, Hei 2-239219 or Eurodisplay '90 (Holland) Lecture No. 2.6, for example, disclose a proposed polarization transforming optics which uses a PBS, a ½ wave plate or two ¼ wave plates and a mirror. The PBS takes part in polarizing separation, the ½ wave plate or two ¼ wave plates take part in rotation of a polarizing plane and the mirror takes part in deflection of a heading direction.

Also, as disclosed in, for example, Japanese Patent Application Laid-open Nos. Sho 61-122626, Sho 61-126516, Sho 63-168626 or Hei 2-93580, a polarization transforming optics has been proposed which uses a PBS, a ¼ wave plate and a mirror. The PBS takes part in polarizing separation, the ¼ wave plate in rotation of a polarizing plane and the mirror in deflection of a heading direction.

Further, as disclosed in, for example, Japanese Patent Application Laid-open No. Sho 63-197913, Japanese Utility Model Application Laid-open No. Hei 1-88902, Japanese Patent Application Laid-open No. Hei 2-64613, The Institute of Electronic Information and Communication Engineers of Japan, 1st Year of Heisei, Autumn Nationwide Meeting Lecture, Summary C-34 or "Flat Panel Display", '91, pp 225–231, a polarization transforming optics has been proposed which uses a PBS and two or more mirrors. The PBS has the polarizing separation function and the two or more mirrors have the heading direction deflecting function and the polarizing plane rotating function.

It is to be noted that the use of a mirror or a prism for deflection of an optical axis and rotation of an image is known in the art. For example, Optical Engineering Handbook, pp 518–519 shows that an amici prism having two mirror surfaces functions to rotate an image. Since the polarizing plane rotates concomitantly with the image rotation, it is known that two or more mirrors have the function of rotating the polarizing plane.

However, the prior art polarization transforming optics using the PBS faces problems as below.

The polarization transforming optics using the PBS, the ½ wave plate or two ¼ wave plates and the mirror, disclosed in, for example, the aforementined Japanese Patent Application Laid-open No. Sho 61-90584 includes, in addition to the PBS of a cubic form, one right-angled prism having half the volume of the PBS and a wave plate in the form of a flat plate. When the volume of the wave plate having a small thickness is neglected, the polarization transforming optics has a volume which is 1.5 times the cubic form of the PBS and so can be relatively compact. In the wave plate, however, the phase difference of birefringence has great dependency upon wavelength and hence the utilization efficiency of light is degraded when white light is incident on the wave plate. For example, the aforementioned Eurodisplay '90 (Holland) Lecture No. 2.6 shows that while the ideal light utilization efficiency is twice the conventional light utilization efficiency which is 50%, the actually obtained light utilization efficiency is only 1.34 to 1.5 times the conventional 50% light utilization efficiency. In addition, when the optics is applied to a projection type LCD, flux of light from a light source is very high in intensity of illumination and therefore light-proof capability of the wave plate is a matter of importance.

The polarization transforming optics using the PBS, ¼ wave plate and mirror, disclosed in, for example, the aforementioned Japanese Patent Application Laid-open No. Sho 61-122626 includes, in addition to the cubic PBS, the ¼ wave plate and a planar reflector. When the volume of the wave plate and planar reflector each having a small thickness is neglected, the polarization transforming optics has a volume which corresponds to one cube of the PBS and so can have a minimum size. However, because of the use of the wave plate as in the case of the just above-described prior art, there occur problems of degradation in light utilization efficiency and light-proof capability of the wave plate. Especially, in the aforementioned Japanese Patent Application Laid-open No. Sho 61-90584, only one of the two beams of synthesized light flux passes once through the wave plate but the other does not. Contrary to this, in the prior art of '26, one of the two beams of synthesized light flux passes once through the ¼ wave plate once and the other passes through three times. Accordingly, in comparison with the prior art of '84, the degradation in the light utilization efficiency is aggravated. In addition, intensity of illumination light incident on the wave plate further increases, making the problem of light-proof capability of the wave plate more serious.

The polarization transforming optics using the PBS and the two or more mirrors, disclosed in, for example, the aforementioned Japanese Utility Model Application Laid-open No. Hei 1-88902 includes, in addition to the cubic PBS, four right-angled prisms each having a volume which is half the volume of the PBS. The rotation of the polarizing plane is effected using a total reflection surface of the right-angled prism, with the result that the light utilization efficiency is higher than that of the prior art using the wave plate and the problem of light-proof capability does not occur. But, in addition to the cubic PBS the four right-angled prisms each having a volume which is half the volume of the PBS are also used and consequently a total volume is three times the cubic volume, resulting in an increased size which is two to three times the size of the prior art using the wave plate. Accordingly, an LCD using the polarization transforming optics is also increased in size. Further, as the size of the prism increases, a large glass material is required for use as the prism, raising the cost. Especially, in order to obtain a PBS having an excellent polarization capability (contrast ratio) for incident white light, a glass material having a larger refractive index than that of BK7 must be used. But such a glass material is in general more expensive than BK7 and because of a large amount of the material being used, the cost is raised drastically.

The aforementioned Japanese Patent Application Laid-open No. Sho 63-197913 shows the polarization transforming optics using the PBS and the two mirrors. Assumptively, when right-angled prisms are used in place of the mirrors, two right-angled prisms each having a volume which is half the volume of the cubic PBS are used in addition to the PBS and a relatively small total volume results which is twice the cubic volume. But, two beams of light flux delivered from the polarization transforming optics are displaced from each other by a width of each light flux beam in both the longitudinal direction (z direction) and lateral direction (x direction) and there results a synthesized light flux having a cross-sectional form which is not rectangular, demonstrating unsuitability of the polarization transforming optics for an LCD using a rectangular liquid crystal light valve. Conceivably, the mirrors may be inclined to cause heading directions of the two light flux beams to be deflected inwards by the same angle, so that the two light flux beams intersect with each other to provide light suitable for illumination of the liquid crystal light valve. In this case, however, the displacement between the two light flux beams is large amounting up to about 1.41 times the width of each light flux and consequently the deflection angle must be increased, with the result that the incident angle to the liquid crystal light valve is increased to degrade the contrast performance. If a color separation/synthesis optical system of, for example, dichroic mirrors is interposed between the liquid crystal light valve and polarization transforming optics, the incident angle to these mirrors is also increased to degrade color purity and aggravate color shading.

In the polarization transforming optics of the aforementioned Japanese Patent Application Laid-open Nos. Sho 61-90584, Sho 61-122626 and so on, because of the use of the wave plate, the light utilization efficiency is degraded and the problem of light-proof capability is raised and in the polarization transforming optics of the aforementioned Japanese Utility Model Application Laid-open No. Hei 1-88902, Japanese Patent Application Laid-open No. Sho 63-197913 and so on, the two or more mirrors are needed in addition to the PBS. Especially, in an application to an LCD, the distance between optical axes of the two beams of light flux delivered from the PBS has to be reduced, thus requiring at least four mirrors. Accordingly, the size of the optical system is increased and the size of a glass material used therefor is also increased, raising the cost.

SUMMARY OF THE INVENTION

Accordingly, an object of the invention is to provide a compact polarization transforming optics having a high light utilization efficiency, a PBS used for the polarization transforming optics and an LCD using the polarization transforming optics.

The above object can be attained by a polarization transforming optics comprising light flux splitting means for splitting flux of light into two beams of light flux, polarizing separation means for separating each light flux beam into two linearly polarized light flux beams having polarizing directions which are orthogonal to each other, and light flux deflecting means for deflecting the heading direction of light flux.

According to one aspect of the invention, a polarization transforming optics comprises: a PBS for splitting incident light flux from a light source into a first split light flux beam and a second split light flux beam, the PBS including a first PBS film for separating the first split light flux beam into a first linearly polarized transmission light flux beam and a first linearly polarized reflection light flux beam, the first transmission and reflection light flu beams having polarizing directions which are orthogonal to each other, a second PBS film for separating the second split light flux beam into a second linearly polarized transmission light flux beam and a second linearly polarized reflection light flux beam, the second transmission and reflection light flux beams having polarizing directions which are orthogonal to each other, a first mirror surface for deflecting the first transmission light flux beam in the same heading direction as that of the second reflection light flux beam, and a second mirror surface for deflecting the second transmission light flux beam in the same heading direction as that of the first reflection light flux beam; and a third mirror surface for deflecting a first outgoing light flux beam in the form of synthesized light flux of the first transmission light flux beam deflected by the first mirror surface and the second reflection light flux beam in the same heading direction as that of a second outgoing light flux beam in the form of synthesized light flux of the second transmission light flux beam deflected by the second mirror and the first reflection light flux beam.

Most advantageously, the polarization transforming optics of the present invention can split light flux into two split light flux beams by using the PBS of a specific construction having, for example, the two PBS films and the two mirror surfaces.

In the PBS of the invention, thanks to the specific construction, the heading directions of the incident light flux and the two outgoing light flux beams are orthogonal to each other and the polarized components of the two outgoing light flux beams are both parallel to a plane containing the two outgoing light flux beams. Therefore, in order to realize a polarization transforming optics by using the PBS of the present invention, there is needed only one mirror for deflecting and transforming the heading direction of at least one of the two outgoing light flux beams into the heading direction of the other but there is no need of providing an optical element for rotating the polarizing plane of at least one of the two outgoing light flux beams to transform the linear polarization direction of the one outgoing light flux into that of the other outgoing light flux.

Further, the polarization transforming optics of the invention does not use any wave plate for rotation of the polarizing plane. Accordingly, the light utilization efficiency is higher in the present optics than in the prior art using the wave plate and the problem of light-proof capability does not occur.

Further, the polarization transforming optics of the invention may be constructed of, for example, a total of four prisms including one right-angled quadrangular pyramidal prism having a volume which is ⅓ of the prior art cubic PBS, two right-angled triangular pyramidal prisms each having a volume which is 1/6 of the cube and one right-angled triangle pole prism having a volume which is half the cube. Therefore, the polarization transforming optics has a total volume which is about 1.17 times the cube, indicating that the size can be reduced drastically to measure a half or less of the volume of the prior art using four right-angled prisms.

Furthermore, the PBS of the invention has the specific polarizing operation lacked by the prior art PBS in which the heading directions of the incident light flux and two outgoing light flux beams are orthogonal to each other and the polarized components of the two outgoing light flux beams are both parallel to the plane containing the two outgoing light flux beams, and can be applied effectively to a optical apparatus requiring the polarizing operation.

In addition, in the LCD of the invention, synthesized light flux of the two light flux beams delivered from the compact polarization transforming optics having a high light utilization efficiency is used as illumination light for the liquid crystal light valve and hence the apparatus can be reduced in size as a whole and can provide bright projection images.

BRIEF DESCRIPTION OF THE DRAWINGS

FIG. 1A is an exploded perspective view of the FIG. 1 PBS;

FIG. 3A is a flow chart showing splitting/separation of light flux in the third embodiment;

FIG. 3B is a similar flow chart for a prior art using a PBS shown in FIG. 10;

DESCRIPTION OF THE PREFERRED EMBODIMENTS

Figure 1:
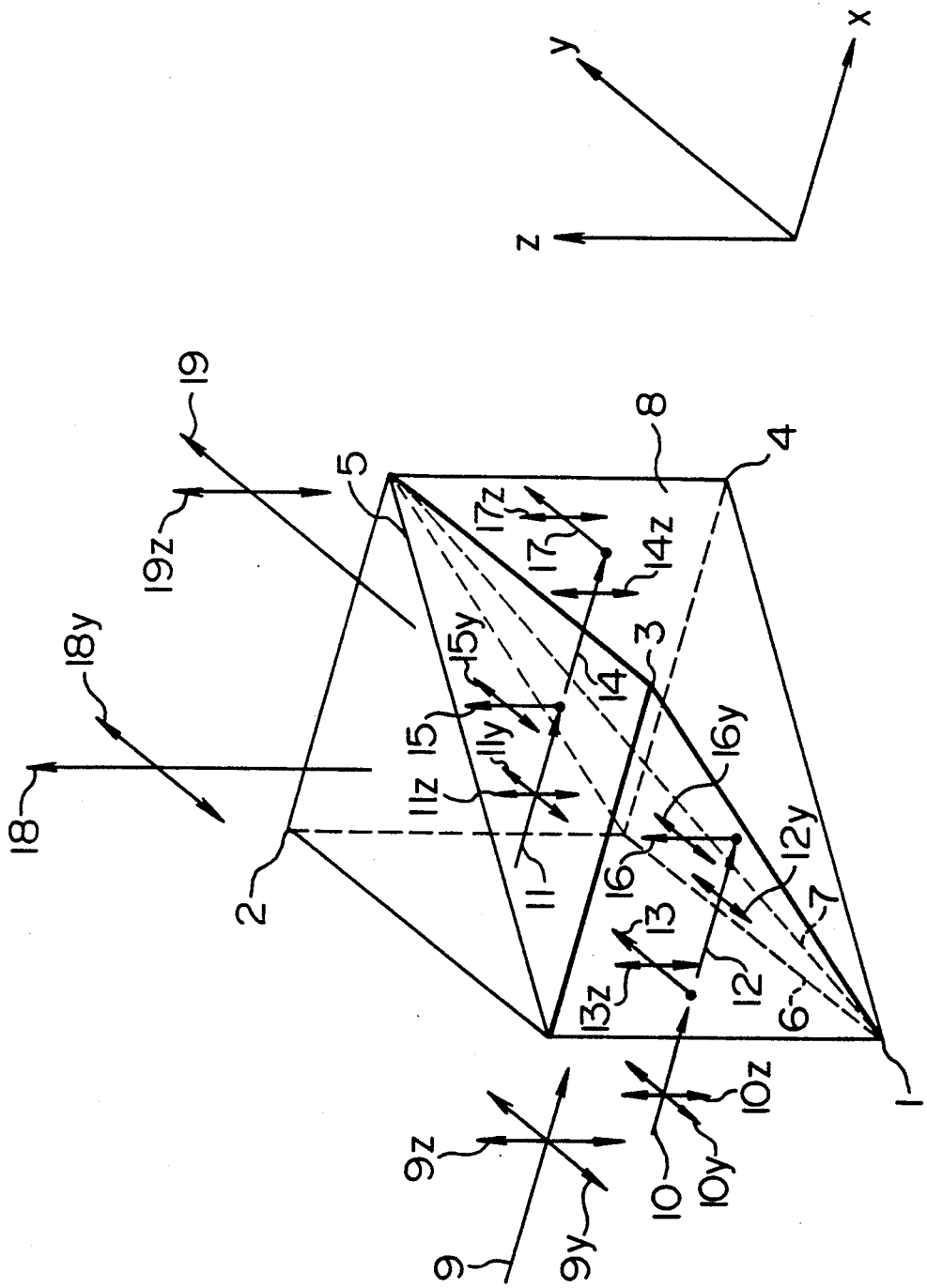
FIG. 1 is a perspective view showing a PBS according to a first embodiment of the invention.

The present invention will now be described by way of example with reference to the accompanying drawings. In the drawings, like components are designated by like reference numerals throughout the various embodiments and will be described in detail when they are described for the first time in the specification but their descriptions will subsequently be omitted.

FIG. 1 is a perspective view showing a first embodiment of a polarizing beam splitter 1 according to a first embodiment of the invention. The polarizing beam splitter (PBS) 1 has a shape in which a quadrangular pyramidal prism 2 and two triangular pyramidal prisms 3 and 4 are jointed to each other as shown in FIG. 1A to form as a whole a cube which is partly cut away. Formed at a joint interface between the quadrangular pyramidal prism 2 and triangular pyramidal prism 3 is a PBS film 5 and formed at a joint interface between the quadrangular pyramidal prism 2 and triangular pyramidal prism 4 is a PBS film 6, the PBS films being optical multi-layer thin films. The triangular pyramidal prism 3 has a surface in contact with air which is a total reflection mirror surface 7 and the triangular pyramidal prism 4 has a surface in contact with air which is a total reflection mirror surface 8. In general, optical glass BK7 is used as a glass material of each prism. In order to obtain a PBS having an excellent polarization capability (contrast ratio) for incident white light, a glass material having a larger refractive index than that of BK7 may be used. Further, with a view of obtaining an inexpensive PBS, an optical plastic such as PMMA having a small retardation (phase difference of birefringence) may be used. When an optical multi-layer thin film is formed directly on optical plastic, the film is liable to peel off owing to film tension and the number of layers used cannot be sufficiently large, making it difficult to obtain a PBS of excellent polarization capability. To cope with this problem, a PBS may be produced by forming a film on a thin glass plate in advance and sandwiching the film between the glass plate and prism of optical plastic. The present PBS 1 is mainly used for a polarization transforming optics of a liquid crystal display (LCD). In such an application, the PBS is used for a lighting system of a liquid crystal light valve and therefore such a high accuracy as a wavelength order is not required of the surface configuration of the PBS 1. In addition, since the glass material is allowed to be mixed with foams to some extent, the PBS 1 can be produced at relatively low costs.

A polarizing separation operation will be described by referring to an instance where flux of light 9 heading in the x direction of Cartesian coordinates shown in the figure impinges upon the PBS 1, on the assumption that the incident light flux 9 is unpolarized light containing equally a polarized component 9y in the y direction and a polarized component 9z in the z direction, and that the incident light flux 9 has a cross-sectional form which is square like each side of a cube. The incident light flux 9 reaching the two PBS films 5 and 6 is split into two beams of light flux 10 and 11 to be handled by the PBS films 5 and 6, respectively. While the light flux 9 has the same square cross-sectional form as the incident surface of the PBS 1, the split two light flux beams 10 and 11 have cross-sectional forms of the same right-angled isosceles triangles as the splitting surfaces (5 and 6), respectively.

The light flux 10 reaching the PSB film 5 is separated into two beams of linearly polarized light flux 12 and 13 having polarizing directions which are mutually orthogonal. More specifically, the P polarized light flux 12 transmitting through the PBS film 5 and heading in the x direction contains only a y-direction polarized component 12y corresponding to a polarized component 10y of the light flux 10, and the S polarized light flux 13 reflected by the PBS film 5 and heading in the y direction contains only a z-direction polarized component 13z corresponding to a polarized component 10z of the incident light flux 10. The light flux 12 containing only the y-direction polarized component 12y is deflected by the total reflection mirror surface 7 of the triangular pyramidal prism 3 and turns into light flux 16 heading in the z direction. Since the polarizing direction is not changed by the deflection, the light flux 16 contains only a y-direction polarized component 16y.

On the other hand, the light flux 11 reaching the PBS film 6 is separated into two beams of linearly polarized light flux 14 and 15 having polarizing directions which are mutually orthogonal. More specifically, the P polarized light flux 14 transmitting through the PBS film 6 and heading in the x direction contains only a z-direction polarized component 14z corresponding to a polarized component 11z of the light flux 11, and the S polarized light flux 15 reflected by the PBS film 6 and heading in the z direction contains only a y-direction polarized component 15y corresponding to a polarized component 11y of the light flux 11. The light flux 14 containing only the z-direction polarized component 14z is deflected by the total reflection mirror surface 8 and turns into light flux 17 heading in the y direction. Since the polarizing direction is not changed by the deflection, the light flux 17 contains only a z-direction polarized component 17z.

Each light flux 13, 15, 16 or 17 has the cross-sectional form of a right-angled isosceles triangle, and the light flux 15 and light flux 16 go out in parallel from areas having the common oblique side and similarly the light flux 13 and light flux 17 go out in parallel from areas having the common oblique side. Therefore, the former set of the light flux beams 15 and 16 is reconstructed into synthesized outgoing light flux 18 of the same square cross-sectional form as that of the incident light flux 9 and the latter set of the light flux beams 13 and 17 is reconstructed into synthesized outgoing light flux 19 of the same square cross-sectional form as that of the light flux 9. Thus, the outgoing light flux 18 heading in the z direction contains only a y-direction polarized component 18y corresponding to the polarized component 9y and the outgoing light flux 19 heading in the y direction contains only a z-direction polarized component 19z corresponding to the polarized component 9z. The polarized components 18y and 19z of the two outgoing light flux beams 18 and 19 are both parallel to y plane containing the two outgoing light flux beams 18 and 19.

Therefore, in order to realize a polarization transforming optics by using the PBS 1 of the present invention, only one mirror is needed for deflecting and transforming the heading direction of at least one of the two outgoing light flux beams 18 and 19 into the heading direction of the other but there is no need of providing an optical element for rotating the polarizing plane of at least one of the two outgoing light flux beams 18 and 19 and to transform the linear polarization direction of the one outgoing light flux into that of the other outgoing light flux.

Further, since the polarizing operation, in which the heading directions of the incident light flux 9 and the two beams of outgoing light flux 18 and 19 are mutually orthogonal and the polarized components 18y and 19z of the two beams of outgoing flux 18 and 19 are both parallel to the plane containing the two outgoing light flux beams 18 and 19, is characteristic of the PBS 1 of the present invention and the conventional PBS lacks such an operation, the PBS of the present invention can effectively be used for not only the polarization transforming optics but also for an optical apparatus requiring that polarizing operation.

While in the present embodiment, the PBS 1 is constructed of one quadrangular pyramidal prism 2 and two triangular pyramidal prisms 3 and 4, the number of the prisms is not limited to the above.

Figure 2:
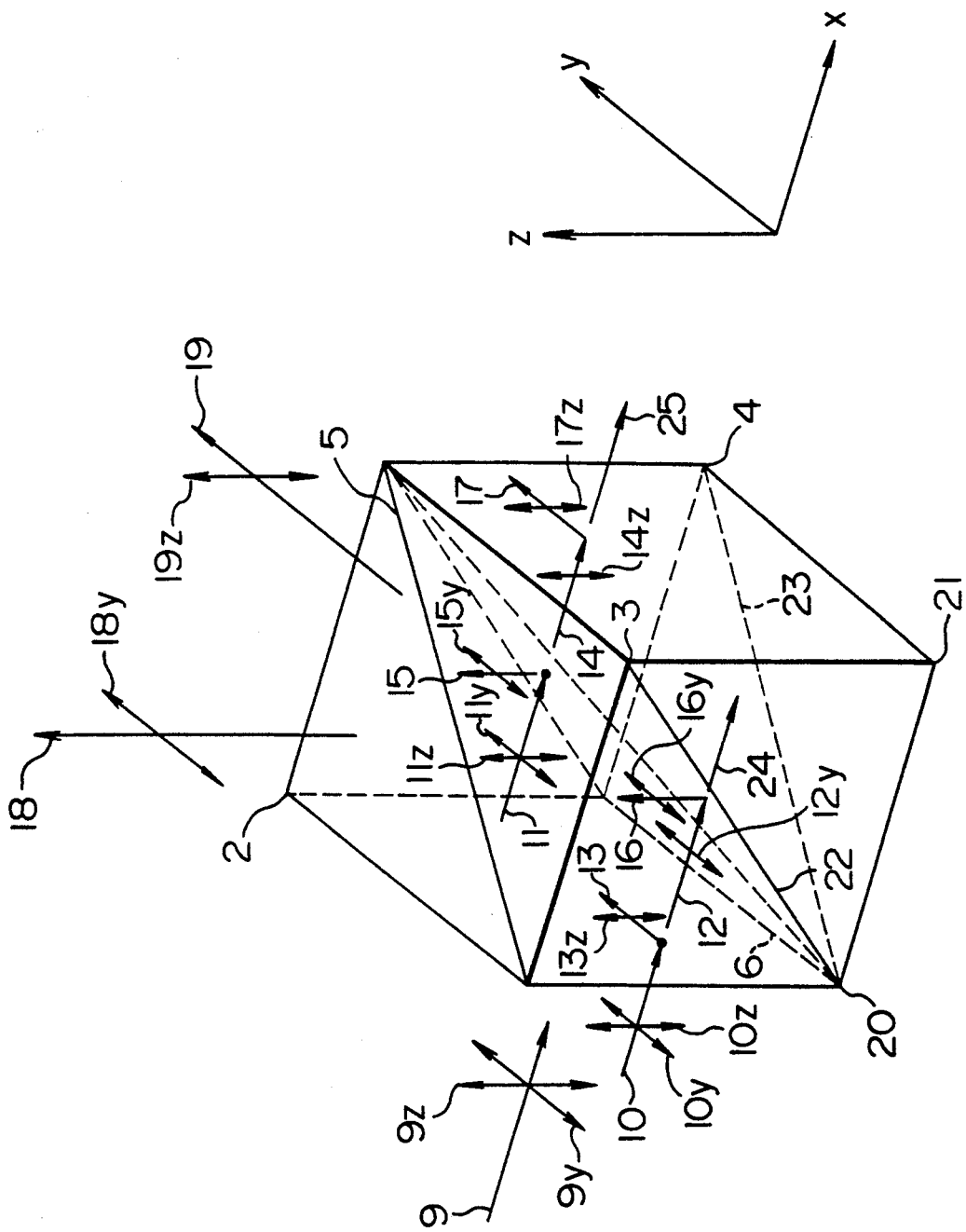
FIG. 2 is a perspective view showing a PBS according to a second embodiment of the invention.

FIG. 2 is a perspective view showing a PBS according to a second embodiment of the invention.

Figure 2A:
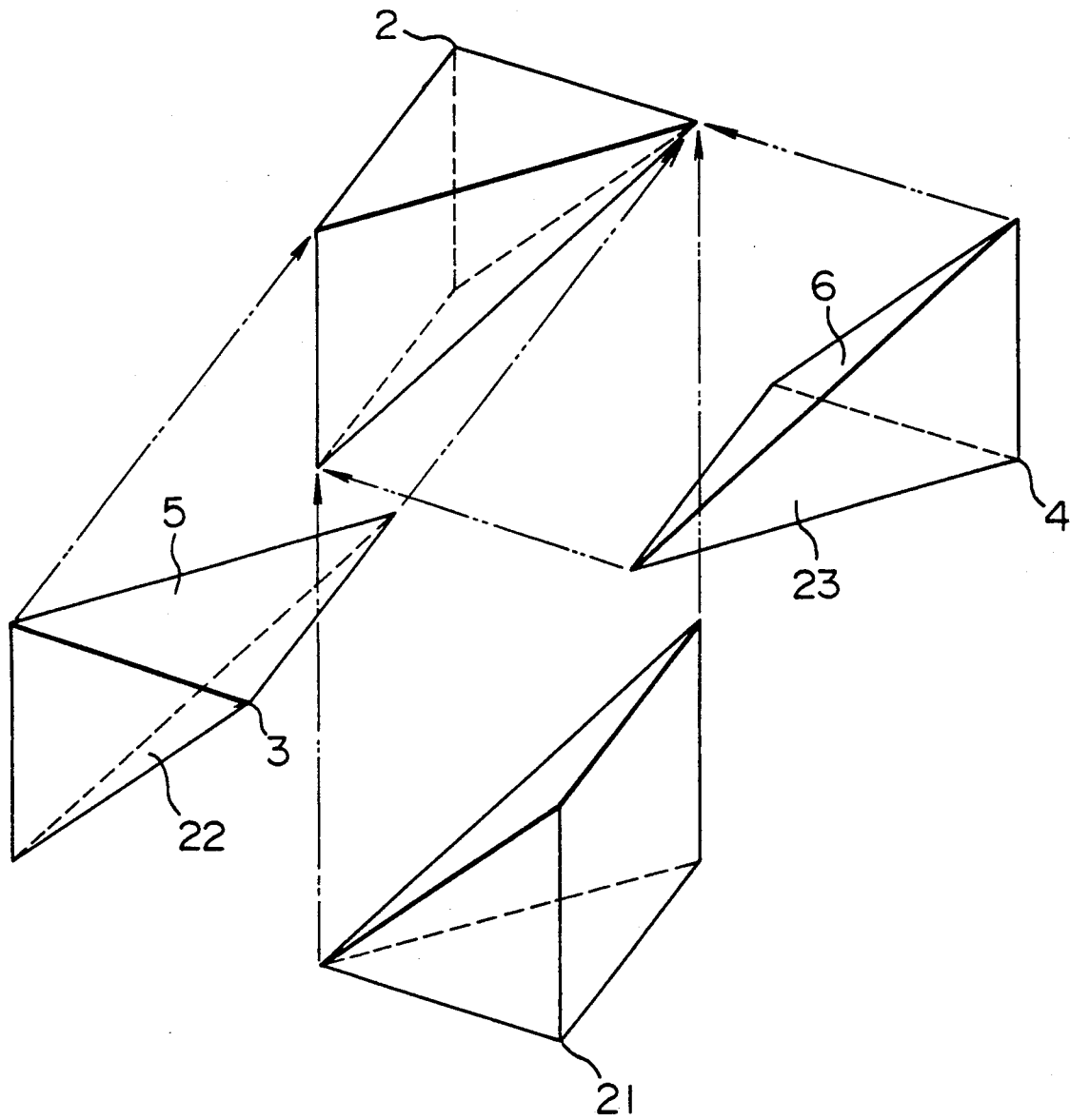
FIG. 2A is an exploded perspective view of the FIG. 2 PBS.

The PBS 20 has a shape in which two quadrangular pyramidal prisms 2 and 21 and two triangular pyramidal prisms 3 and 4 are jointed to each other as shown in FIG. 2A to form as a whole a cube. Formed at a joint interface between the quadrangular pyramidal prism 2 and triangular pyramidal prism 3 is a PBS film 5 and formed at a joint interface between the quadrangular pyramidal prism 2 and triangular pyramidal prism 4 is a PBS film 6, the PBS films being optical multi-layer thin films. In addition, a PBS film 22 of an optical multi-layer thin film is formed at a joint interface between the quadrangular pyramidal prism 21 and triangular pyramidal prism 3 and a PBS film 23 of an optical multi-layer thin film is formed between the quadrangular pyramidal prism 21 and triangular pyramidal prism 4.

A polarizing separation operation will be described by referring to an instance where flux of light 9 heading in the x direction of Cartesian coordinates shown in the figure impinges upon the PBS 20, on the assumption that the incident light flux 9 is unpolarized light containing equally a polarized component 9y in the y direction and a polarized component 9z in the z direction, and that the incident light flux 9 has a cross-sectional form which is square like each side of the cube. The incident light flux 9 reaching the two PBS films 5 and 6 is split into two beams of light flux 10 and 11 to be handled by the PBS films 5 and 6, respectively. While the light flux 9 has the square cross-sectional form, the split two beams of light flux 10 and 11 have each a cross-sectional form of a right-angled isosceles triangle. The light flux 10 reaching the PBS film 5 is separated into two beams of linearly polarized light flux 12 and 13 having polarizing directions which are mutually orthogonal. More specifically, the P polarized light flux 12 transmitting through the PBS film 5 and heading in the x direction contains only a y-direction polarized component 12y corresponding to a polarized component 10y of the light flux 10, and the S polarized light flux 13 reflected by the PBS film 5 and heading in the y direction contains only a z-direction polarized component 13z corresponding to a polarized component 10z of the incident light flux 10. The light flux 12 containing only the y-direction polarized component 12y acts as S polarized light on the PBS film 22, with the result that the light flux 12 is deflected by total reflection and turns into light flux 16 heading in the z direction. Since the polarizing direction is not changed by the deflection, the light flux 16 contains only a y-direction polarized component 16y.

On the other hand, the light flux 11 reaching the PBS film 6 is separated into two beams of linearly polarized light flux 14 and 15 having polarizing directions which are mutually orthogonal. More specifically, the P polarized light flux 14 transmitting through the PBS film 6 and heading in the x direction contains only a z-direction polarized component 14z corresponding to a polarized component 11z of the light flux 11, and the S polarized light flux 15 reflected by the PBS film 6 and heading in the z direction contains only a y-direction polarized component 15y corresponding to a polarized component 11y of the light flux 11. The light flux 14 containing only the z-direction polarized component 14z acts as S polarized light on the PBS film 23, with the result that the light flux 14 is deflected by total reflection and turns into light flux 17 heading in the y direction. Since the polarizing direction is not changed by the deflection, the light flux 17 contains only a z-direction polarized component 17z.

Each light flux 13, 15, 16 or 17 has the cross-sectional form of a right-angled isosceles triangle and the light flux 15 and light flux 16 go out in parallel from areas having the common oblique side and similarly the light flux 13 and light flux 17 go out in parallel from areas having the common oblique side. Therefore, the former set of the light flux beams 15 and 16 is reconstructed into synthesized outgoing light flux 18 of the same square cross-sectional form as that of the incident light flux 9 and the latter set of the light flux beams 13 and 17 is reconstructed into synthesized outgoing light flux 19 of the same square cross-sectional form as that of the light flux 9. Thus, the outgoing light flux 18 heading in the z direction contains only a y-direction polarized component 18y corresponding to the polarized component 9y and the outgoing light flux 19 heading in the y direction contains only a z-direction polarized component 19z corresponding to the polarized component 9z. The polarized components 18y and 19z of two beams of outgoing light flux 18 and 19 are both parallel to the yz plane containing the two beams of outgoing light flux 18 and 19.

Since the PBS 20 has a similar polarizing operation to that of the PBS 1, addition of only one mirror to the PBS 20 is sufficient to constitute a polarization transforming optics and besides the PBS 20 can be used effectively for other optical apparatues.

When each of the PBS films 5, 6, 22 and 23 of the PBS 20 has a spectral characteristic which permits transmission of S polarized light of other light than visual light, unwanted and harmful infrared rays and ultraviolet rays contained in the incident light flux 9 are allowed to transmit through a set of the PBS films 5 and 22 and a set of the PBS films 6 and 23, turning into light flux 24 and light flux 25 which head in the x direction. Accordingly, the two beams of outgoing light flux 18 and 19 can contain only visual light components. In this manner, the PBS 20 has, in addition to the aforementioned polarizing operation, a filter function for cutting infrared rays and ultraviolet rays.

The PBS 20 has a point-symmetrical shape and therefore can be used by receiving either light coming from the front or light coming from the back. In other words, while in the case of the PBS 1 the incident light flux 9 can head in only the +x direction the outgoing light flux 18 can head in only the +z direction and the outgoing light flux 19 can head in only the +y direction, these beams of light flux are permitted in the case of the PBS 20 to head not only in the +x, +z and +y directions, respectively, but also in the -x,-z and -y directions, respectively. Therefore, the PBS 20 can be used efficiently for an optical apparatus which requires such a polarizing operation.

Figure 3:
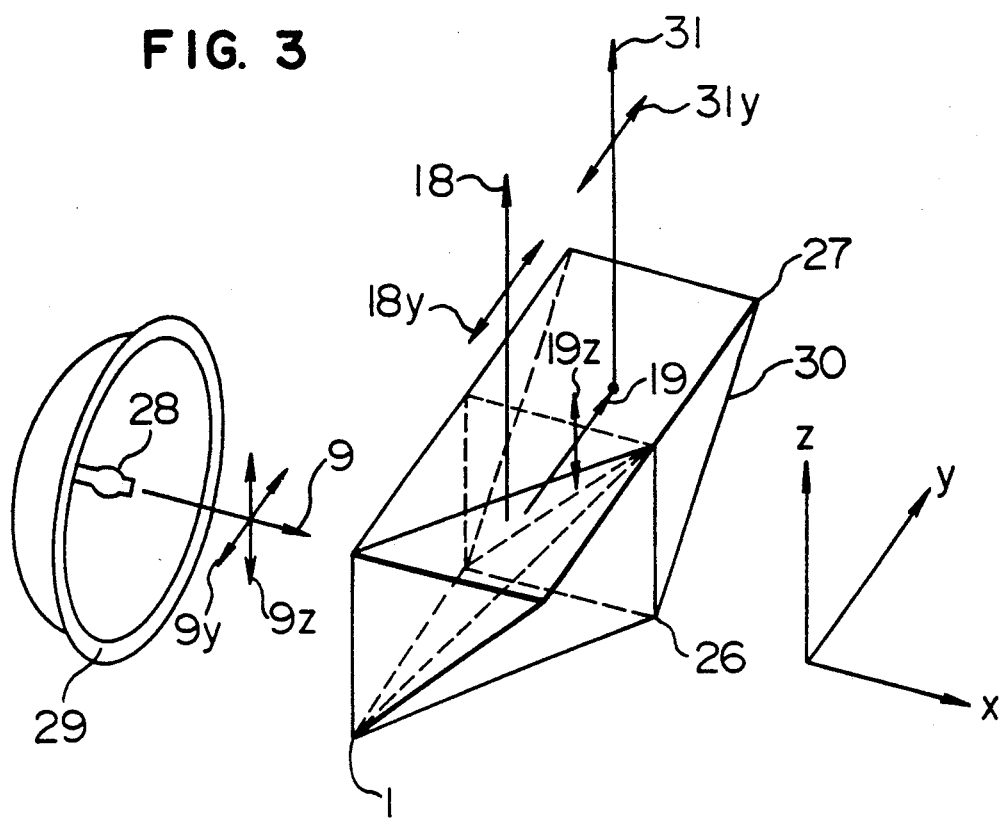
FIG. 3 is a perspective view of a polarization transforming optics according to a third embodiment of the invention.

FIG. 3 is a perspective view showing a polarization transforming optics 26 according to a third embodiment of the invention. The polarization transforming optics 26 is constructed of a PBS 1 and a prism 27 in the form of a right-angled triangle pole. The procedure of transforming flux of light 9 from a light source into linearly polarized light will now be described with reference to FIG. 3.

Light flux 9 emitted from the light source of a metal halide lamp 28 is reflected by a parabolic mirror 29 so as to become a substantially parallel beam. The beam heads in the x direction of Cartesian coordinates shown in the figure and impinges upon the PBS 1 constituting the polarization transforming optics. The light flux 9 from the light source is unpolarized light which contains equally a polarized component 9y in the y direction and a polarized component 9z in the z direction.

The incident light flux 9 is separated by the polarizing operation of the PBS 1 into two outgoing light flux beams 18 and 19. The outgoing light flux 18 heading in the z direction contains only a y-direction polarized component 18y corresponding to the polarized component 9y and the outgoing light flux 19 heading in the y direction contains only a z-direction polarized component 19z corresponding to the polarized component 9z. The polarized components 18y and 18z of the two beams of outgoing light flux 18 and 19 are both parallel to the yz plane containing the two beams of outgoing light flux 18 and 19.

The light flux 19 containing only the z-direction polarized component is reflected by a total reflection mirror surface 30 of the prism 27 of right-angled triangle shape, turning into light flux 31 heading in the z direction. Since the polarizing direction is changed by the reflection from the z direction to the y direction, the light flux 31 contains only a y-direction polarized component 31y.

Eventually, the two outgoing light flux beams 18 and 31 both head in the z direction and contain only y-direction polarized components 18y and 31y.

Figure 10:
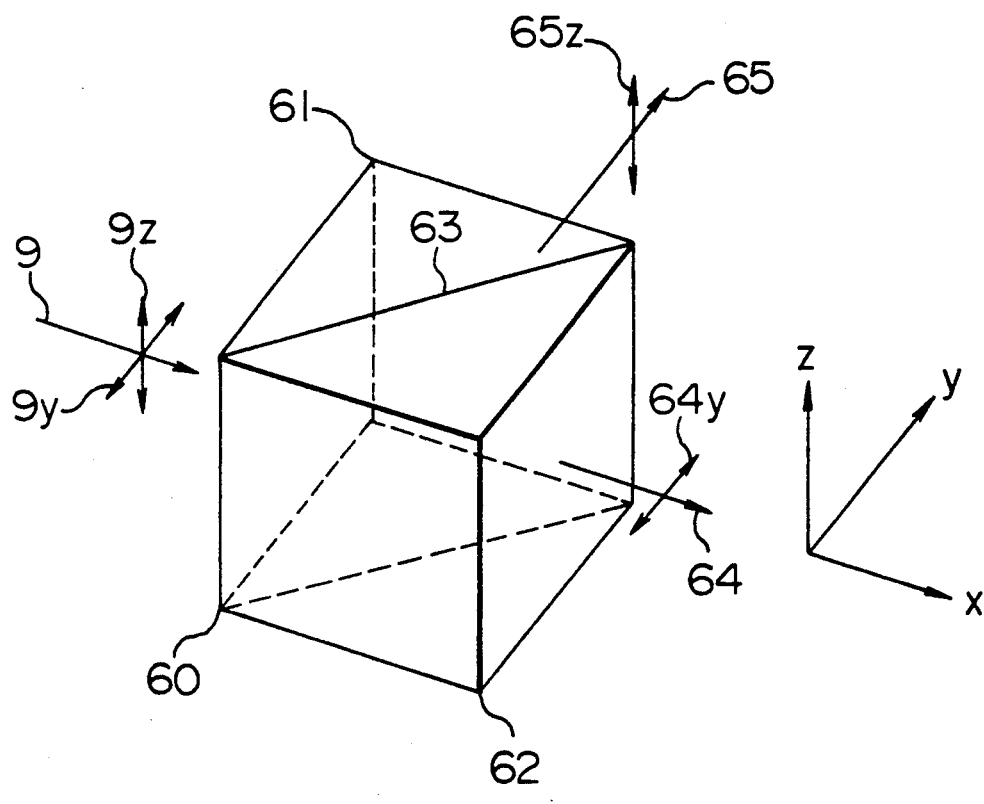
FIG. 10 is a perspective view showing a prior art PBS.

A process for transforming the incident light flux 9 into the two beams of outgoing light flux 18 and 19 and delivering the outgoing light flux beams 18 and 19 to a liquid crystal light valve 37 is shown in FIG. 3A in which reference numerals correspond to those in FIGS. 1 and 3. Similarly, a process for transforming incident light flux 9 from a polarization transforming optics using a prior art beam splitter of FIG. 10 disclosed in, for example, the previously-described Japanese Utility Model Application Laid-open No. Hei 1-88902 into two beams of outgoing light flux 64 and 65 and delivering the outgoing light flux beams 64 and 65 to a liquid crystal light valve is shown in FIG. 3B. In comparison with FIG. 3A, the light flux in FIG. 3B is delivered to the liquid crystal light valve through four mirror surfaces of right-angled triangle pole prisms P1 to P4. In the present embodiment, the rotation of polarizing plane is effected by means of the PBS 1 and the total reflection mirror 30 of right-angled triangle pole prism 27, without using any wave plate and therefore, in comparison with the prior art using the wave plate, the utilization efficiency of light can be promoted and the problem of light-proof capability does not occur. When the cubic volume of the prior art PBS 60 is referenced to, the polarization transforming optics 26 constructed of a total of four prisms including one right-angled quadrangular pyramidal prism 2 having ⅓ of the cubic volume, two right-angled triangular pyramidal prisms 3 and 4 each having 1/6 of the cubic volume and one right-angled triangle pole prism 27 having ⅓ of the cubic volume totals in volume to about 1.17 times the cubic volume and in comparison with the prior art using four right-angled prisms and amounting to a volume of three cubes, the optics 26 can be reduced greatly in size to less than a half.

In the present embodiment, the polarization transforming optics 26 is comprised of the PBS 1 but it is not limited thereto.

Figure 4:
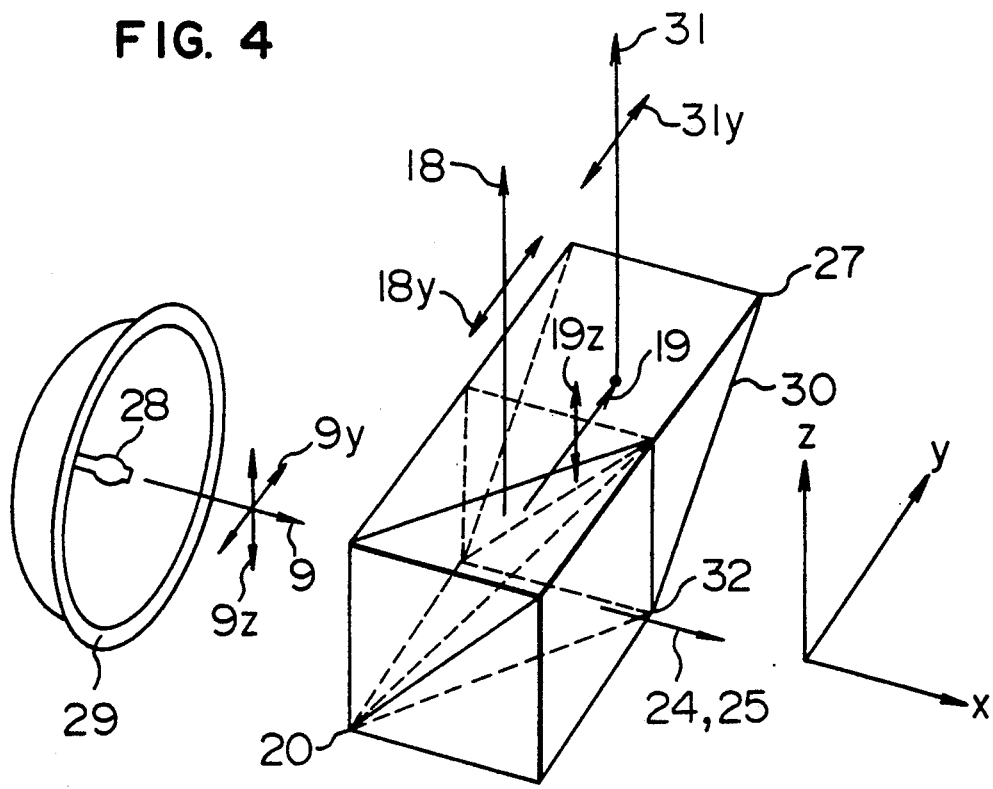
FIG. 4 is a perspective view of a polarization transforming optics according to a fourth embodiment of the invention.

FIG. 4 is a perspective view showing a polarization transforming optics 32 according to a fourth embodiment of the invention. The polarization transforming optics 32 is constructed of a PBS 20 and a right-angled triangle pole prism 27 and performs a similar polarizing operation to that of the polarization transforming optics 26.

In the present embodiment, the rotation of polarizing plane is effected by means of the PBS 20 and the total reflection mirror 30 of the right-angled triangle pole prism 27, without using any wave plate and therefore, in comparison with the prior art using the wave plate, the utilization efficiency of light can be improved and the problem of light-proof capability does not occur. When the cubic volume of the PBS 60 is referenced to, the polarization transforming optics 32 constructed of a total of five prisms including two right-angled quadrangular pyramidal prisms 2 and 21 each having ⅓ of the cubic volume, two right-angled triangular pyramidal prisms 3 and 4 each having 1/6 of the cubic volume and one right-angled triangle pole prism 27 having ⅓ of the cubic volume totals in volume to about 1.5 times the cubic volume and in comparison with the prior art using four right-angled prisms and amounting to a volume of three cubes, the optics 32 can be reduced greatly in size to half.

Unwanted and harmful infrared rays and ultraviolet rays contained in the incident light flux 9 from the light source turn into light flux beams 24 and 25 heading in the x direction. Therefore, the two beams of outgoing light flux 18 and 31 can contain only visual light components. In this manner, the polarization transforming optics 32 has, in addition to the aforementioned polarizing operation, a filter function for cutting infrared rays and ultraviolet rays.

In the present embodiment, the prisms alone are used for the polarization transforming optics but alternatively they may be replaced partly or totally with plate type optical elements.

Figure 5:
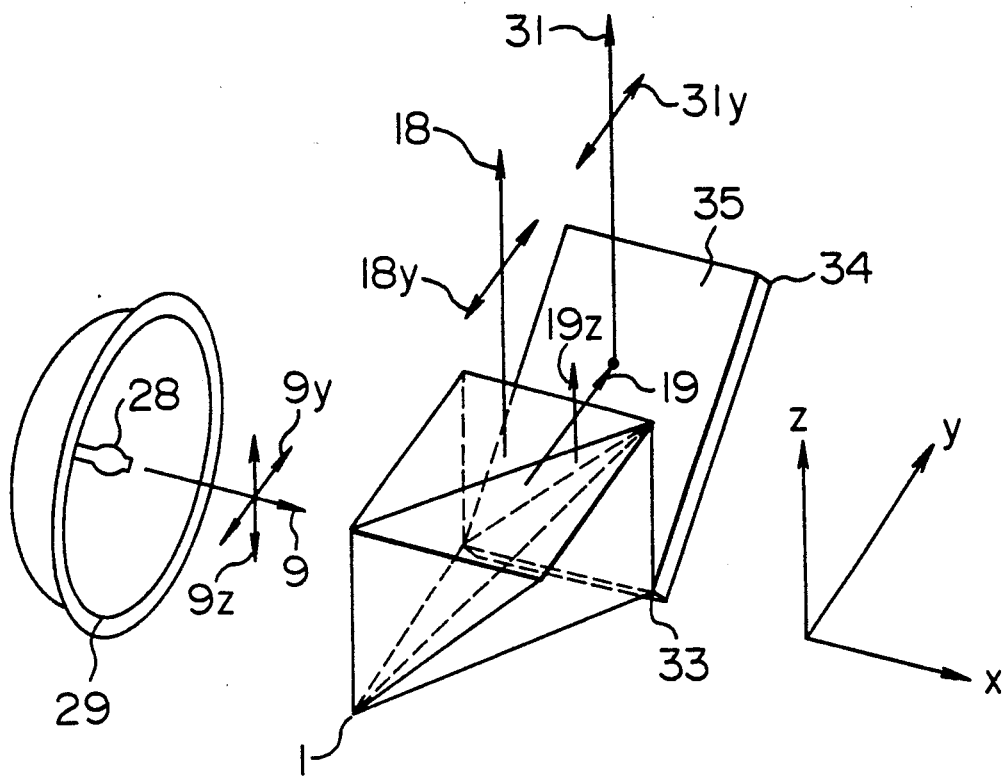
FIG. 5 is a perspective view of a polarization transforming optics according to a fifth embodiment of the invention.

FIG. 5 is a perspective view showing a polarization transforming optics 33 according to a fifth embodiment of the invention. The polarization transforming optics 33 is constructed of a PBS 1 and a mirror 34 of plate type and performs a similar polarizing operation to that of the polarization transforming optics 26. A mirror surface 35 of the mirror 34 is an intensified reflection surface formed of an optical multi-layer film and its reflection factor is slightly smaller than that of the total reflection mirror surface 30 of the right-angled triangle pole prism 27.

In the present embodiment, the rotation of a polarizing plane is effected by means of the PBS 1 and the mirror surface 35 of the mirror 34, without using any wave plate and therefore, in comparison with the prior art using the wave plate, the utilization efficiency of light can be promoted and the problem of light-proof capability does not occur.

Through the use of the mirror cheaper than the prism, inexpensiveness of the polarization transforming optics can be ensured.

Further, by changing the relative angle between the mirror 34 and PBS 1, the heading directions of the two beams of outgoing light flux 18 and 31 can be deflected by a desired angle.

The two beams of light flux 18 and 31 delivered from the polarization transforming optics 26, 32 and 33 of the third to fifth embodiments are each of a square cross-sectional form and they are delivered in parallel to provide a total outgoing light flux of a cross-sectional form of a rectangle having a ratio between major and minor side lengths which is 2:1. This total outgoing light flux is therefore suitable for lighting a liquid crystal light valve which is used for a an LCD and which has a rectangular form.

Figure 6:
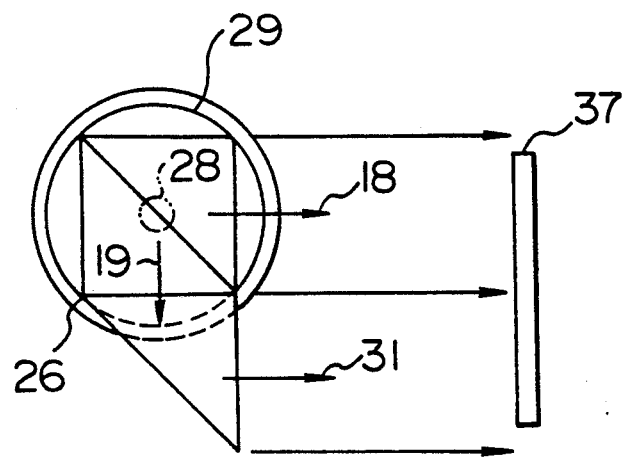
FIGS. 6 to 8 are top views showing LCD's according to sixth to eighth embodiments of the invention, respectively.

FIG. 6 is a top view of an LCD according to a sixth embodiment of the invention and using the FIG. 3 arrangement. The LCD includes a light source of a metal halide lamp 28, a parabolic mirror 29, a polarization transforming optics 26 and a liquid crystal light valve 37.

From the standpoint of utilization efficiency of illumination light, the liquid crystal light valve 37 preferably has a shape approximating an aspect ratio of 2:1. For example, on the assumption that the light utilization efficiency is 100% for the 2:1 aspect ratio, the light utilization efficiency is 66.7% for an aspect ratio of 4:3 and 88.9% for an aspect ratio of 16:9. Accordingly, from the viewpoint of light utilization efficiency, the present embodiment is more suitable for the high definition system having a laterally elongated display screen of 16:9 than for the NTSC system having a 4:3 display screen. In the present embodiment, the two beams of outgoing light flux 18 and 31 head in parallel directions and maintain the aspect ratio of 2:1 for impingement upon the liquid crystal light valve 37, but the invention is in no way limited thereto.

Figure 7:
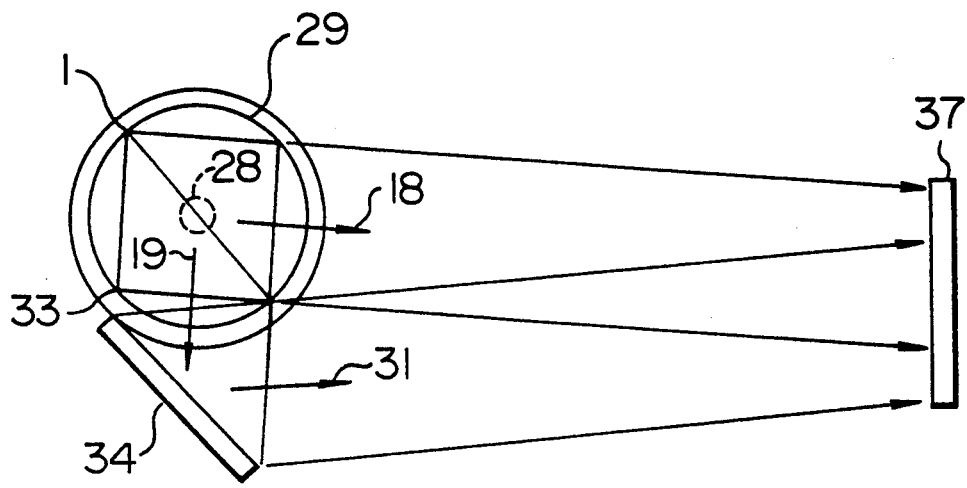

FIG. 7 is a top view showing an LCD according to a seventh embodiment of the invention and using the FIG. 5 arrangement. The LCD device 38 includes a light source of a metal halide lamp 28, a parabolic mirror 29, a polarization transforming optics 33 and a liquid crystal light valve 37. In order to reduce the longitudinal length of light for illumination of the liquid crystal light valve 37, the disposition of a PBS 1 is rotated in one direction about the optical axis of light flux 9 from the light source and the disposition of an associated mirror 34 is rotated in the opposite direction so that the heading directions of two beams of outgoing light flux 18 and 31 from the polarization transforming optics are deflected inwards by the same angle and the two outgoing light flux beams 18 and 31 intersect with each other.

Since in the present embodiment the aspect ratio of the illumination light can be changed to a desired value, the light utilization efficiency will not be degraded for the case of a 4:3 aspect ratio. From the viewpoint of contrast performance, the incident angle to the liquid crystal light valve 37 needs to be small. This requires that the distance between the polarization transforming optics 33 and liquid crystal light valve 37 be sufficiently large, resulting in an increase in the size of the apparatus. But in the case where a color separation/synthesis element such as a dichroic mirror is interposed between the polarization transforming optics 33 and liquid crystal light valve 37, the polarization transforming optics 33 is already been sufficiently distant from the liquid crystal light valve 37 and hence a further increase in size of the apparatus will not be caused by the present embodiment.

In the present embodiment, the heading directions of the two beams of outgoing light flux 18 and 31 are deflected inwards by the same angle to change the aspect ratio but the invention is not limited to the deflection by the same angle.

Figure 8:
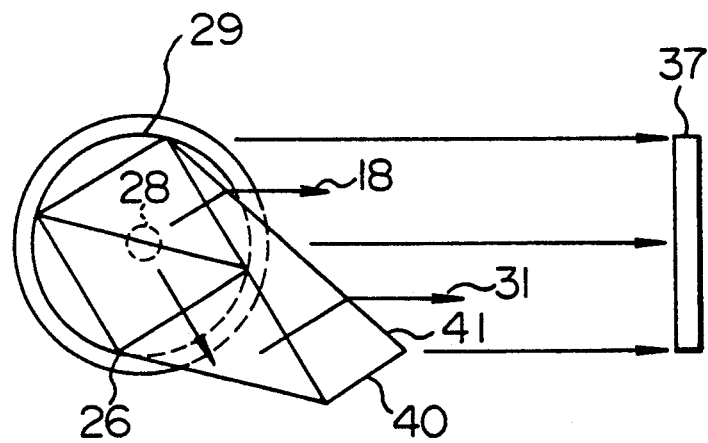

FIG. 8 is a top view of an LCD according to an eighth embodiment of the invention and using the FIG. 3 arrangement. The LCD includes a light source of a metal halide lamp 28, a parabolic mirror 29, a polarization transforming optics 26 and a liquid crystal light valve 37. In order to reduce longitudinal length of light for illumination of the liquid crystal light valve 37, a beam shaping prism 40 is interposed between the polarization transforming optics 26 and the liquid crystal light valve 37 and the disposition of the polarization transforming optics 26 is rotated about the optical axis of the incident light.

According to the present embodiment, since the aspect ratio of the illumination light can be changed to a desired value by means of the beam shaping prism 40, the light utilization efficiency will not be degraded for the case of the 4:3 aspect ratio. In addition, the width of the light flux can be reduced without disturbing the parallelism between the heading directions of the two beams of outgoing light flux 18 and 31, thus preventing an increase in the size of the apparatus. Also, the P polarized light flux beams 18 and 31 obliquely transmit through an outgoing surface 41 of the beam shaping prism 40, and consequently the transmittivity can be improved as compared to the case where the beam shaping prism 40 is not used. Especially, by selectively setting the incident angle to a Brewster angle (or polarizing angle), a maximum transmitivity can be obtained.

In the present embodiment, the liquid crystal light valve 37 is described as being one in number but this number is not limitative. The invention may also be applied to a projection type LCD using three liquid crystal light valves for R, G and B colors.

Figure 9:
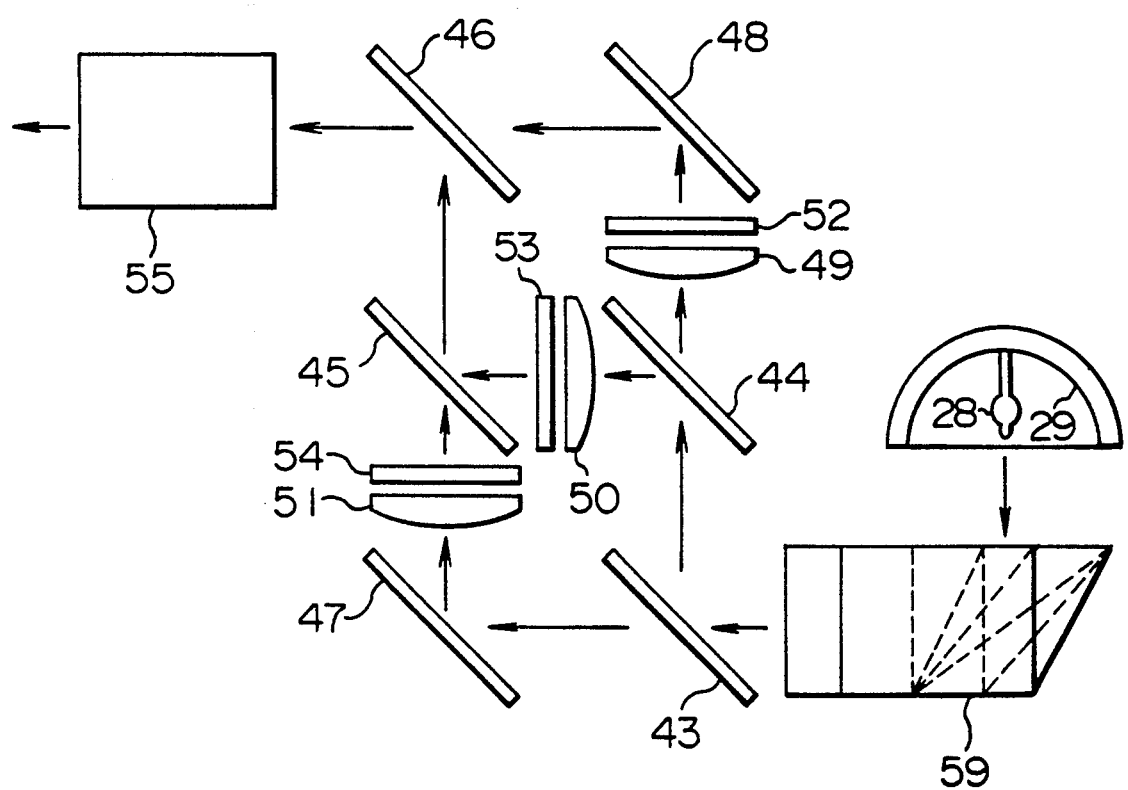
FIG. 9 is a side view of an LCD according to a ninth embodiment of the invention.

FIG. 9 is a side view showing an LCD according to a ninth embodiment of the invention and using the arrangement of FIG. 3 or 4. The LCD includes a light source of a metal halide lamp 28, a parabolic mirror 29, a polarization transforming optics 59, four dichroic mirrors 43, 44, 45 and 46, two mirrors 47 and 48, three condenser lenses 49, 50 and 51, three liquid crystal light valves 52, 53 and 54 and a projector lens 55, these components being arranged as shown in FIG. 9.

In the present embodiment, the polarization transforming optics 59 is disposed at a site where the mirrors of the conventional LCD are otherwise disposed and so the size of the apparatus can be smaller than the conventional apparatus lacking the polarization transforming optics 59.

As described above, according to the invention, a compact polarization transforming optics having high utilization efficiency of light, a PBS using the polarization transforming optics and an LCD using the polarization transforming optics can be obtained.

We claim:

1. A polarization transforming optics comprising:
a polarizing beam splitter (PBS) for splitting incident light flux from a light source into a first split light flux beam and a second split light flux beam, said PBS including a first PBS film for separating said first split light flux beam into a first linearly polarized transmission light flux beam and a first linearly polarized reflection light flux beam, said first transmission and reflection light flux beams having polarizing directions which are orthogonal to each other, a second PBS film for separating said second split light flux beam into a second linearly polarized transmission light flux beam and a second linearly polarized reflection light flux beam, said second transmission and reflection light flux beams having polarizing directions which are orthogonal to each other, a first mirror surface for deflecting said first transmission light flux beam in the same heading direction as that of said second reflection light flux beam, and a second mirror surface for deflecting said second transmission light flux beam in the same heading direction as that of said first reflection light flux beam; and
a third mirror surface for deflecting a first outgoing light flux beam in the form of synthesized light flux of said first transmission light flux beam deflected by said first mirror surface and said second reflection light flux beam in the same heading direction as that of a second outgoing light flux beam in the form of synthesized light flux of said second transmission light flux beam deflected by said second mirror and said first reflection light flux beam.

2. A polarization transforming optics according to claim 1 which is comprised of a quadrangular pyramidal prism, a first triangular pyramidal prism and a second triangular pyramidal prism, wherein said first PBS film is formed at a joint interface between said quadrangular pyramidal prism and first triangular pyramidal prism, said second PBS film is formed at a joint interface between said quadrangular pyramidal prism and second triangular pyramidal prism, said first mirror surface is a total reflection surface in contact with air of said first triangular pyramidal prism, and said second mirror surface is a total reflection surface in contact with air of said second triangular pyramidal prism.

3. A polarization transforming optics according to claim 2 further comprising a triangle pole prism, wherein said third mirror surface is a total reflection surface in contact with air of said triangle pole prism.

4. A polarization transforming optics according to claim 1 which is comprised of a first quadrangular pyramidal prism, a second quadrangular pyramidal prism, a first triangular pyramidal prism and a second triangular pyramidal prism, wherein said first PBS film is formed at a joint interface between said first quadrangular pyramidal prism and first triangular pyramidal prism, said second PBS film is formed at a joint interface between said first quadrangular pyramidal prism and second triangular pyramidal prism, said first mirror surface is a third PBS film formed at a joint interface between said second quadrangular pyramidal prism and first triangular pyramidal prism, and said second mirror surface is a fourth PBS film formed at a joint interface between said second quadrangular pyramidal prism and second triangular pyramidal prism.

5. A polarization transforming optics according to claim 4 further comprising a triangle pole prism, wherein said third mirror surface is a total reflection surface in contact with air of said triangle pole prism.

6. A polarizing beam splitter (PBS) having an input surface for receiving incident light flux, a first output surface for emitting a first outgoing light flux beam, and a second output surface for emitting a second outgoing light flux beam, said PBS comprising:
 a first PBS film for receiving a first portion of said incident light flux as a first split light flux beam and for separating said first split light flux beam into a first linearly polarized transmission light flux beam and a first linearly polarized reflection light flux beam, said first transmission and reflection light flux beams having polarizing directions which are orthogonal to each other;
 a second PBS film for receiving a second portion of said incident light flux as a second split light flux beam and for separating said second split light flux beam into a second linearly polarized transmission light flux beam and a second linearly polarized reflection light flux beam, said second transmission and reflection light flux beams having polarizing directions which are orthogonal to each other;
 a first mirror surface for deflecting said first transmission light flux beam in the same heading direction as that of said second reflection light flux beam, said deflected first transmission light flux beam and said second reflection light flux beam forming said first outgoing light flux beam; and
 a second mirror surface for deflecting said second transmission light flux beam in the same heading direction as that of said first reflection light flux beam, said deflected second transmission light flux beam and said first reflection light flux beam forming said second outgoing light flux beam;
 wherein respective heading directions of said first and second outgoing light flux beams are orthogonal to each other and to a heading direction of said incident light flux; and
 wherein respective polarizing directions of said first and second outgoing light flux beams are parallel to a plane containing said first and second outgoing light flux beams.

7. A polarizing beam splitter (PBS) for splitting incident light flux into a first split light flux beam and a second split light flux beam, comprising:
 a first PBS film for separating said first split light flux beam into a first linearly polarized transmission light flux beam and a first linearly polarized reflection light flux beam, said first transmission and reflection light flux beams having polarizing directions which are orthogonal to each other;
 a second PBS film for separating said second split light flux beam into a second linearly polarized transmission light flux beam and a second linearly polarized reflection light flux beam, said second transmission and reflection light flux beams having polarizing directions which are orthogonal to each other;
 a first mirror surface for deflecting said first transmission light flux beam in the same heading direction as that of said second reflection light flux beam; and
 a second mirror surface for deflecting said second transmission light flux beam in the same heading direction as that of said first reflection light flux beam;
 wherein said PBS is comprised of a quadrangular pyramidal prism, a first triangular pyramidal prism and a second triangular pyramidal prism, wherein said first PBS film is formed at a joint interface between said quadrangular pyramidal prism and first triangular pyramidal prism, said second PBS film is formed at a joint interface between said quadrangular pyramidal prism and second triangular pyramidal prism, said first mirror surface is a total reflection surface in contact with air of said first triangular pyramidal prism, and said second mirror surface is a total reflection surface in contact with air of said second triangular pyramidal prism.

8. A polarizing beam splitter (PBS) for splitting incident light flux into a first split light flux beam and a second split light flux beam, comprising:
 a first PBS film for separating said first split light flux beam into a first linearly polarized transmission light flux beam and a first linearly polarized reflection light flux beam, said first transmission and reflection light flux beams having polarizing directions which are orthogonal to each other;
 a second PBS film for separating said second split light flux beam into a second linearly polarized transmission light flux beam and a second linearly polarized reflection light flux beam, said second transmission and reflection light flux beams having polarizing directions which are orthogonal to each other;

a first mirror surface for deflecting said first transmission light flux beam in the same heading direction as that of said second reflection light flux beam; and a second mirror surface for deflecting said second transmission light flux beam in the same heading direction as that of said first reflection light flux beam;

wherein said PBS is comprised of a first quadrangular pyramidal prism, a second quadrangular pyramidal prism, a first triangular pyramidal prism and a second triangular pyramidal prism, wherein said first PBS film is formed at a joint interface between said first quadrangular pyramidal prism and first triangular pyramidal prism, said second PBS film is formed at a joint interface between said first quadrangular pyramidal prism and second triangular pyramidal prism, said first mirror surface is a third PBS film formed at a joint interface between said second quadrangular pyramidal prism and first triangular pyramidal prism, and said second mirror surface is a fourth PBS film formed at a joint interface between said second quadrangular pyramidal prism and second triangular pyramidal prism.

9. A liquid crystal display (LCD) comprising:

a liquid crystal light valve; and a polarization transforming optics including:

a polarizing beam splitter (PBS) for splitting incident light flux from a light source into a first split light flux beam and a second split light flux beam, said PBS including a first PBS film for separating said first split light flux beam into a first linearly polarized transmission light flux beam and a first linearly polarized reflection light flux beam, said first transmission and reflection light flux beams having polarizing directions which are orthogonal to each other, a second PBS film for separating said second split light flux beam into a second linearly polarized transmission light flux beam and a second linearly polarized reflection light flux beam, said second transmission and reflection light flux beams having polarizing directions which are orthogonal to each other, a first mirror surface for deflecting said first transmission light flux beam in the same heading direction as that of said second reflection light flux beam, and a second mirror surface for deflecting said second transmission light flux beam in the same heading direction as that of said first reflection light flux beam, and a third mirror surface for deflecting a first outgoing light flux beam in the form of synthesized light flux of said first transmission light flux beam deflected by said first mirror surface and said second reflection light flux beam in the same heading direction as that of a second outgoing light flux beam in the form of synthesized light flux of said second transmission light flux beam deflected by said second mirror and said first reflection light flux beam;

wherein said first and second outgoing light flux beams delivered form said polarization transforming optics are both used as illumination light for said liquid crystal light valve.

10. An LCD according to claim 9 wherein in order to reduce the longitudinal length of the illumination light for said liquid crystal light valve, the disposition of said PBS is rotated about the optical axis of incident light flux from said light source so that heading directions of said first and second outgoing light flux beams delivered from said polarization transforming optics may be deflected inwards by the same angle and said first and second outgoing light flux beams may intersect with each other.

11. An LCD according to claim 9 wherein in order to reduce the longitudinal length of the illumination light for said liquid crystal light valve, a beam shaping prism is interposed between said polarization transforming optics and liquid crystal light valve, and the disposition of said polarization transforming optics is rotated about the optical axis of incident light.

* * * * *